United States Patent [19]

Pesce et al.

[11] Patent Number: 5,432,351
[45] Date of Patent: Jul. 11, 1995

[54] X-RAY INTENSIFYING SCREEN

[75] Inventors: Sergio Pesce, Savona; Pierfiore Malfatto, Cairo Montenotte; Sergio Bruno, Cengio Bormida, all of Italy

[73] Assignee: Minnesota Mining and Manufacturing Company, St. Paul, Minn.

[21] Appl. No.: 122,635

[22] Filed: Sep. 17, 1993

[30] Foreign Application Priority Data

Oct. 26, 1992 [IT] Italy ............... MI92A02440

[51] Int. Cl.⁶ ................................................. G01J 1/58
[52] U.S. Cl. ........................ 250/486.1; 250/487.1; 428/690; 252/301.4 R; 252/301.21; 252/301.23
[58] Field of Search ............ 250/486.1, 487.1; 428/690; 252/301.4 R, 301.21, 301.23

[56] References Cited

U.S. PATENT DOCUMENTS

| | | | |
|---|---|---|---|
| 4,028,550 | 6/1977 | Weiss et al. | 250/483 |
| 4,362,944 | 12/1982 | Suzuki et al. | 250/486.1 |
| 4,374,749 | 2/1983 | Cusano et al. | 252/301.36 |
| 4,675,271 | 6/1987 | Degenhardt | 430/139 |
| 4,893,021 | 1/1990 | Bollen et al. | 250/487.1 |

FOREIGN PATENT DOCUMENTS

2613824 10/1977 Germany.
8415469.1 7/1986 Germany.

*Primary Examiner*—Mark L. Bell
*Assistant Examiner*—C. M. Bonner
*Attorney, Agent, or Firm*—Gary L. Griswold; Walter N. Kirn; Mark A. Litman

[57] ABSTRACT

The present invention relates to an X-ray intensifying screen comprising a support, a reflective layer, and a phosphor layer, wherein said phosphor is selected in the group of UV-blue emitting phosphors having their emission maximum at a wavelength shorter than 450 nm, and wherein a fluorescent dye is dispersed into the reflective layer or into a fluorescent dye layer interposed between said reflective layer and said phosphor layer, said fluorescent dye having its spectral absorption maximum at a wavelength shorter than 400 nm and its spectral emission maximum at a wavelength longer than 400 nm.

20 Claims, 2 Drawing Sheets

X-RAY INTENSIFYING SCREEN

FIELD OF THE INVENTION

This invention relates to an X-ray intensifying screen. More specifically, the invention relates to an X-ray intensifying screen comprising a UV-blue emitting phosphor layer and a fluorescent dye layer, the screen having improved speed and sharpness relationship.

BACKGROUND OF THE ART

It is known in the art of medical radiography to employ intensifying screens to reduce the X-ray dosage to the patient. Intensifying screens absorb the X-ray radiations and emit electromagnetic radiations which can be better absorbed by silver halide emulsion layers. Another approach to reduce the X-ray dosage to the patient is to coat two silver halide emulsion layers on the opposite sides of a support to form a duplitized radiographic element.

Accordingly, it is a common practice in medical radiography to use a radiographic assembly consisting of a duplitized radiographic element interposed between a pair of front and back screens.

The typical structure of an intensifying screen comprises a support and a phosphor layer coated thereon. The phosphor layer comprises a fluorescent substance able to emit light when exposed to X-ray, mixed with a binder.

The screens most widely used in radiography can be classified according their characteristic speed in (1) fast screens, (2) average screens, and (3) slow screens. The speed of a screen is directly proportional to the thickness of the phosphor layer and to the grain size of the fluorescent substance.

A well known problem of intensifying screens relates to the sharpness of the resulting image. The presence of the intensifying screen reduces the sharpness of the resulting image, in particular When fast screens are used. This is due to the large fluorescent crystals and to the high thickness employed to realize the fast screens. On the other hand, there are situation wherein a reduction of exposure is of prime importance in spite of some sacrifice in image sharpness.

To increase the amount of fluorescent radiation which impinges the radiographic film interposed between screens, and then to increase the speed of the screen without a significant loss in sharpness, a reflective layer is usually interposed between the fluorescent layer and the support. Titanium dioxide is usually employed as a reflective substance.

However, a part of the far UV light emitted by the fluorescent substance usually employed for UV-blue emitting screens is poorly reflected by titanium dioxide. This means a speed loss which can be calculated in the order of 0.2-0.3 LogE.

In order to recover such a loss of speed, different reflective layers have been suggested, but only a marginal increase of speed has been obtained, probably due to the absorption of the far UV light by the fluorescent layer itself.

DE 2,807,398 discloses an X-ray fluorescent screen comprising colored plastic particles which contain two dyestuffs, one emitting in the red portion of the spectrum and the other emitting a shorter wavelength. Said dyestuffs are particularly effective in combination with $La_2O_3$-LaBr:Tb phosphors.

U.S. Pat. No. 4,028,550 discloses an X-ray screen comprising europium activated fluorohalide phosphors. The use of an aminocoumarine brightening agent is suggested for reduced mottle and improved image quality.

U.S. Pat. No. 4,675,271 discloses an X-ray permanent screen comprising europium and strontium activated fluorohalide storage phosphors for use in digital radiography. The use of diaminostilbene disulfonic acids is suggested to reduce the dispersion of the scanning beam in the persistent layer, providing better picture sharpness.

SUMMARY OF THE INVENTION

The present invention relates to an X-ray intensifying screen comprising a support, a reflective layer, and a phosphor layer, wherein said phosphor is selected from the group of UV-blue emitting phosphors having their emission maximum at a wavelength shorter than 450 nm, and wherein a fluorescent dye is dispersed into the reflective layer or into a fluorescent dye layer interposed between said reflective layer and said phosphor layer, said fluorescent dye having its spectral absorption maximum at a wavelength shorter than 400 nm and its spectral emission maximum at a wavelength longer than 400 nm.

DETAILED DESCRIPTION OF THE INVENTION

One aspect of the present invention relates to an X-ray intensifying screen comprising a support, a reflective layer, and a phosphor layer, wherein said phosphor is an UV-blue emitting phosphor having their emission maximum at a wavelength shorter than 450 nm, and wherein a fluorescent dye layer is interposed between said reflective layer and said phosphor layer, said fluorescent dye layer comprising a fluorescent dye having its spectral absorption maximum at a wavelength shorter than 400 nm and its spectral emission maximum at a wavelength longer than 400 nm.

The phosphors used in the intensifying screen of the present invention emit in the ultraviolet and blue region of the electromagnetic spectrum. More preferably, said UV-blue emitting phosphors have their emission maximum in the wavelength range of from 300-450 nm. UV-blue emitting phosphors which may be used in the intensifying screens of the present invention include UV-blue emitting phosphors known in the art such as lead or lanthanum activated barium sulfate phosphors, barium fluorohalide phosphors, lead activated barium silicate phosphors, gadolinium activated yttrium oxide phosphors, barium fluoride phosphors, alkali metal activated rare earth niobate or tantalate phosphors etc.

UV-blue emitting phosphors are described for example in BE 703,998 and 757,815, in EP 202,875 and by Buchanan et al., J. Applied Physics, vol. 9, 4342-4347, 1968,and by Clapp and Ginther, J. of the Optical Soc. of America, vol. 37, 355-362, 1947. Particularly suitable UV-blue emitting phosphors for use in the intensifying screens of the present invention are those represented by the following general formula:

$(Y_{1-\frac{3}{2}x-\frac{1}{2}y}Sr_xLi_y)TaO_4$ wherein x and y are numbers which meet the conditions $10^{-5} \leq x \leq 1$ and $10^{-4} \leq x \leq 0.1$ as described in EP 202,875.

Figure 1:
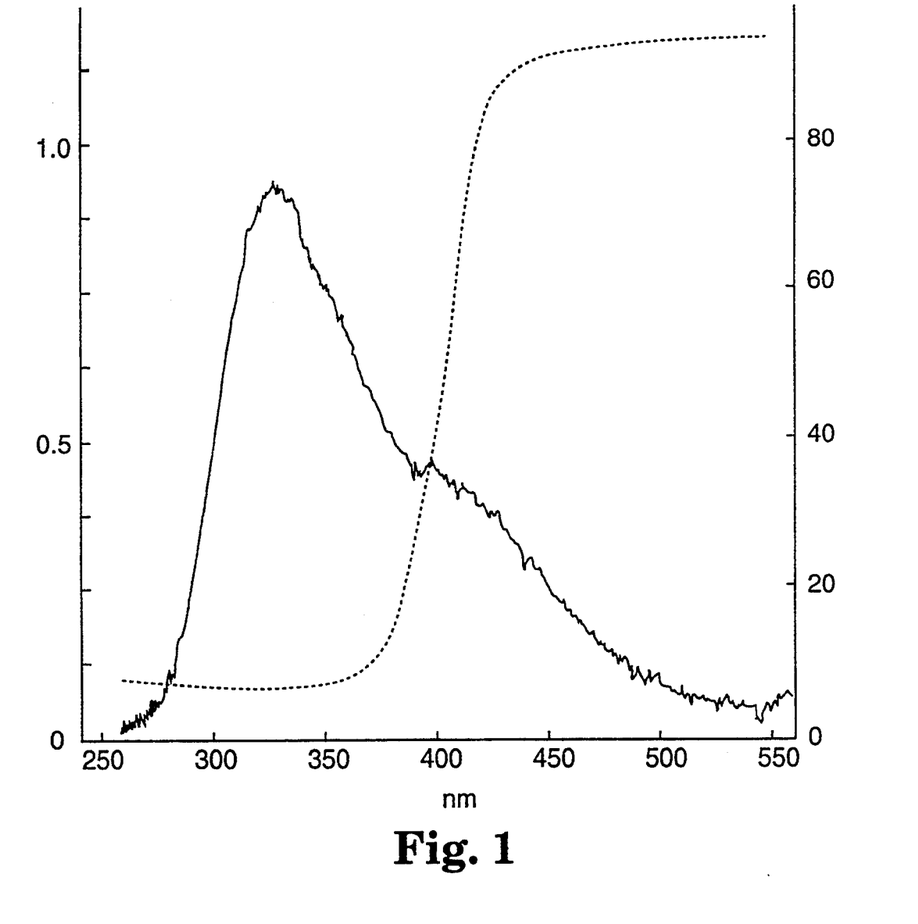
FIG. 1 is a diagram representing the emission spectrum of an UV-blue emitting phosphor (continuous line) in comparison with the reflective spectrum of a layer of titanium dioxide (dotted line). The phosphor emission is expressed as output counts (in thousands). The reflective spectrum is expressed as reflectance percent.

FIG. 1 (continuous line) shows an emission spectrum of an intensifying screen comprising a fluorescent layer of (Y, Sr, Li)TaO$_4$ phosphor as UV-blue emitting phosphor, expressed as fluorescence (F) versus wavelengths (nm).

References to other well known kind of light emitting phosphors can be found in Research Disclosure, Vol. 184, August 1979, Item 18431, Section IX.

The intensifying screens of this invention have a phosphor layer comprising a binder and at least one phosphor dispersed therein. The phosphor layer is formed by dispersing the phosphor in the binder to prepare a coating dispersion having the desired phosphor weight ratio, and then applying the coating dispersion by a conventional coating method to form a uniform layer. Although the phosphor layer itself can be an intensifying screen when the phosphor layer is self-supporting, the phosphor layer is generally provided on a substrate to form an intensifying screen.

The binder employed in the phosphor layer of the intensifying screen of the present invention can be, for example, one of the binders commonly used in forming layers: gum arabic, protein such as gelatin, polysaccharides such as dextran, organic polymer binders such as polyvinylbutyral, polyvinylacetate, nitrocellulose, ethylcellulose, vinylidene-chloride-vinylchloride copolymer, polymethylmethacrylate, polybutylmethacrylate, vinylchloride-vinylacetate copolymer, polyurethane, cellulose acetate butyrate, polyvinyl alcohol, and the like.

Generally, the binder is used in an amount of 0.01 to 1 part by weight per one part by weight of the phosphor. However, from the viewpoint of the sensitivity and the sharpness of the screen obtained, the amount of the binder should preferably be small. Accordingly, in consideration of both the sensitivity and the sharpness of the screen and the easiness of application of the coating dispersion, the binder is preferably used in an amount of 0.03 to 0.2 parts by weight per one part by weight of the phosphor. The thickness of the phosphor layer is generally within the range of from 10 to 500 μm, preferably of from 30 to 300 μm.

In the intensifying screens of the present invention, the phosphor layer is coated on a substrate. As the substrate, various materials such as polymer material, glass, wool, cotton, paper, metal, or the like can be used. From the viewpoint of handling the screen, the substrate should preferably be processed into a sheet or a roll having flexibility. In this connection, as the substrate is preferably either a plastic film (such as a cellulose triacetate film, polyester film, polyethylene terephthalate film, polyamide film, polycarbonate film, or the like), or ordinary paper or processed paper (such as a photographic paper, baryta paper, resin-coated paper, pigment-containing paper which contains a pigment such as titanium dioxide, or the like). In providing a phosphor layer on the substrate a coating dispersion comprising the phosphor dispersed in a binder may be directly applied to the substrate.

Between the phosphor layer and the substrate is interposed a reflective layer to increase the amount of radiation emitted by the screen. The reflective layer may be composed of any of the well-known reflective agents or pigments dispersed in a suitable binder. Pigments such as TiO$_2$, ZrO$_2$, MgO, ZnO, Al$_2$O$_3$, PbCO$_3$, MgCO$_3$, PbSO$_4$, calcium titanate, potassium titanate are already known and widely used. As the binder for the reflective layer any hydrophilic colloid can be used, such as gelatin, gelatin derivatives, polyurethane, polyvinylacetate, polyvinylalcohol and the like. In order to improve the reflecting power of the substrate, the base support may be metallized by coating a thin layer of a reflective metal, such as, for example, aluminum. The thickness of the reflective layer is generally higher than 10 μm, preferably in the range of from 15 to 40 μm.

Further, in the intensifying screens of the present invention, a protective layer for physically and chemically protecting the phosphor layer is generally provided on the surface of the phosphor layer intended for exposure (on the side opposite the substrate). The protective layer may be provided on the phosphor layer by directly applying thereto a coating dispersion to form the protective layer thereon, or may be provided thereon by bonding thereto the protective layer formed beforehand. As the material of the protective layer, a conventional material for a protective layer such a nitrocellulose, ethylcellulose, cellulose acetate, polyester, polyethyleneterephthalate, and the like can be used.

The substrate may have a primer layer on one surface thereof (the surface on which the phosphor layer is provided) for the purpose of holding the phosphor layer tightly. As the material of the primer layer, an ordinary adhesive can be used. In this case the reflective layer is interposed between the primer layer and the phosphor layer.

Figure 2:
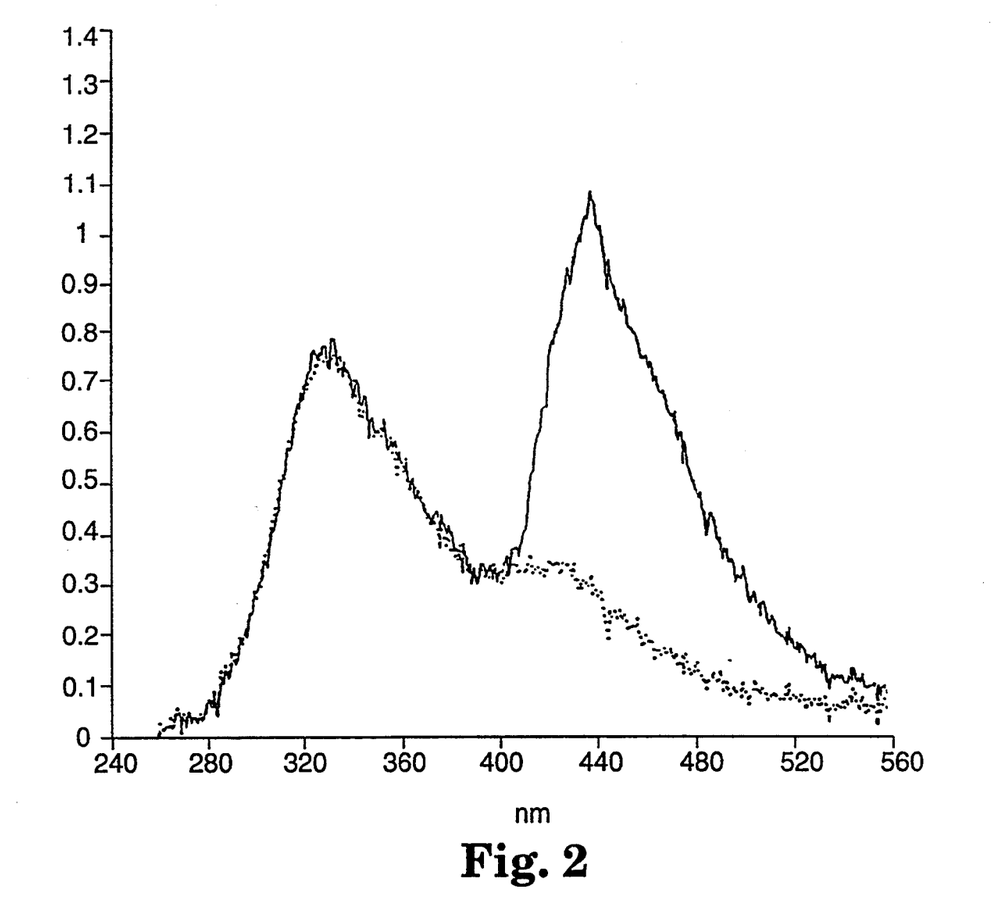
FIG. 2 is a diagram showing the light emission spectrum emitted by a conventional UV-blue emitting screen with a standard $TiO_2$ reflective layer (dotted line) in comparison to the light emission spectrum emitted by a similar screen where a fluorescent dye layer has been added (continuous line). The phosphor emission is expressed as output counts (in thousands).

The fluorescent dye useful in the intensifying screen of the present invention can be dispersed into the reflective layer or into a fluorescent dye layer interposed between the phosphor layer and the reflective layer. The fluorescent dye layer comprises a fluorescent dye dispersed in a proper binder. To define the present invention, the term "dispersed" is used for sake of conciseness, but it should be understood that the fluorescent dye can also be dissolved, emulsified or mixed into the reflective layer or the fluorescent dye layer. Fluorescent dyes or brighteners are known in the art for their property of shift the light towards a longer wavelength. The fluorescent dyes useful in the present invention show an absorption maximum wavelength shorter than 400 nm, preferably in the range of from 300 to 390 nm, and an emission maximum wavelength longer than 400 nm, preferably in the range of from 410 to 450 nm. As disclosed in Fig. 1 the light emitted by the UV-blue phosphors usually employed in the intensifying screens has an emission wavelength in the range of from 300 to 450 nm. The light having a wavelength shorter than 400 nm is hardly reflected by conventional reflective layers. In conventional intensifying screens part of this light emission (i.e., the back part emitted towards the reflective layer) is not used for the formation of the image and a partial loss of speed occurs. The presence of the fluorescent dye shifts the backward emitted light with wavelengths shorter than 400 nm to a light with a wavelength longer than 400 nm, as disclosed in FIG. 2. Part of this shifted light is directly emitted towards the screen surface and part is reflected by the reflective layer. This shifting does not interfere with the UV-light directly emitted by the phosphor layer, but concerns only that portion of far UV-light back emitted towards the reflective layer. According to the preferred embodiment of the present invention, the fluorescent dye is dispersed in a separate fluorescent dye layer which is interposed between the phosphor layer and the reflective layer. However, it should be understood that the scope of the invention can also be obtained by dispersing the fluorescent dye directly into the reflective layer without the need of an additional fluorescent dye layer.

The fluorescent dyes useful for the purpose of the present invention can be chosen among the well known brightening agents. References to this class of compounds can be found in Color Index International, Third Edition, 1987, published by The Society of Dyers and Colourists, Bradford, West Yorkshire, England, under the section "C.I. Fluorescent Brighteners".

According to a preferred embodiment of the present invention, said fluorescent dyes are stilbene sulfonate and bistriazinylaminostilbene sulfonate derivatives. Stilbene sulfonate derivatives are compounds having a nucleus consisting of two sulfonate benzene rings joined by an ethylene group, said benzene rings being optionally substituted with organic substituents. Bistriazinylaminostilbene sulfonate derivatives are compounds having a nucleus consisting of two sulfonate benzene rings joined by an ethylene group, said benzene rings being each substituted with an aminotriazine group, optionally substituted with organic substituents.

Said stilbene sulfonate derivatives are represented by the following formula (I):

wherein X is SO$_3$H or SO$_3$M, in which M is an alkaline metal (such as Li, Na or K) or alkaline earth metal (such as Mg, Ca, Sr or Ba), Y is represented by the following formula:

in which A is a bivalent atom or group of atoms, Z is a group of atoms capable of completing a 5- or 6-membered heterocyclic ring, said ring containing from 1 to 3 nitrogen atoms and 2 to 5 carbon atoms, $R_1$ and $R_2$ independently may be a hydrogen atom, a hydroxyl group, an aryloxy group, (e.g., phenoxyl, o-toloxyl, p-sulfophenoxyl, etc.), an alkoxyl group, (e.g., methoxyl, ethoxyl, propoxyl, butoxyl, isopropoxyl, isobutoxyl, isopentoxyl, etc.), a polyoxyalkylene, a halogen atom, (e.g., chlorine, bromine, etc.) a heterocyclic radical, (e.g., morpholynyl, piperidyl, etc.), an alkylthio group, (e.g., methylthio, ethylthio, etc.), an arylthio group, (e.g., phenylthio, tolylthio, etc.), a heterocyclylthio group, (e.g., benzothiazylthio, etc.) an amino group, an alkylamino group, (e.g., methylamino, ethylamino, propylamino, dimethylamino, diethylamino, dodecylamino, cyclohexylamino, β-hydroxyethylamino, di-β-hydroxyethylamino, β-sulfoethylamino, etc.), or an arylamino group, (e.g., anilino, o-,m- and p-sulfoanilino, o-,m- and p-chloroanilino, o-,m- and p-anisylamino, o-,m- and p-toludino, o-,m- and p-carboxyanilino, o-,m- and p-aminoanilino, o-,m- and p-hydroxyanilino, p-acetamidoanilino, sulfonaphthylamino, etc.), and wherein n is 1 to 4, and m is 0 to 1.

Said bistriazinylaminostilbene sulfonate derivatives are represented by the following formula (II):

wherein X, $R_1$, $R_2$ and n are the same described in formula (I) above.

Examples of such stilbene sulfonate and bistriazinylaminostilbene sulfonate derivatives useful in the present invention are listed below, but these are not the sole examples that can be used in the present invention. Useful stilbene sulfonate derivatives are disclosed, for example, in U.S. Pat. Nos. 2,875,058, 2,933,390, 2,945,762, 2,961,318 and in Research Disclosure, Item 17804, February 1979 and Item 308119, December 1989, Section V. Other references can be found in the above cited Color Index under the section "C.I. Fluorescent Brighteners" and in the section "Stilbene Dyes", in particular from the dye number 40600 to 40799. Such stilbene sulfonate and bistriazinylaminostilbene sulfonate derivatives are sold under various trade names such as LEUCOPHOR B, CALCOFLUOR WHITE MR, TINOPAL (SP, SFP, STP, MSP, WR, BV277, 2B, GS, NG), UVITEX (2B, 2BF, 4BN-A, CK, CF), BLANCOFOR SC, HILTAMINE (BSP, N, 6T6), and the like. Some of these commercial compositions comprise fluorescent brighteners which are identified only for their chemical class and Color Index number. The exact chemical formula of many of these compounds is not yet known. In spite of this, their chemical properties and, in particular, their optical properties can be readily ascertained.

C.I. Fluorescent Brightener 9 (40621)

C.I. Fluorescent Brightener 17 (40637)

C.I. Fluorescent Brightener 28 (40622)

C.I. Fluorescent Brightener 30 (40600)

C.I. Fluorescent Brightener 32 (40620)

C.I. Fluorescent Brightener 34 (40605)

C.I. Fluorescent Brightener 83 (40635)

C.I. Fluorescent Brightener 243 (40618)

C.I. Fluorescent Brightener 245 (40615)

The stilbene sulfonate and bistriazinylaminostilbene sulfonate derivatives above can be present in an amount of from 1 to 15%, preferably from 2 to 10% by weight of the total weight of the resulting fluorescent dye layer. The stilbene sulfonate and bistriazinylaminostilbene sulfonate derivatives are dissolved in the binder and then coated on the reflective layer. As the binder for the fluorescent dye layer any hydrophilic colloid can be used, such as gelatin, gelatin derivatives, polyvinylacetate, polyvinylalcohol and the like. The thickness of the resulting fluorescent dye layer is in the range of from 1 to 30 μm, preferably of from 1 to 10 μm.

The radiographic element to be used with the intensifying screen of the present invention can be prepared by coating a light-sensitive silver halide emulsion layer and other auxiliary layers on at least one side of a support. A single side or a double side radiographic element can be indifferently used. Examples of materials suitable for the preparation of the support include glass, paper, polyethylene-coated paper, metals, polymeric film such as cellulose nitrate, cellulose acetate, polystyrene, polyethylene terephthalate, polyethylene, polypropylene and other well known supports. Preferably, the silver halide emulsion layers are coated on the support at a total silver coverage of at least 1 g/m$^2$, preferably in the range of from 2 to 5 g/m$^2$.

The silver halide emulsion layers can comprise silver halide grains having a regular crystal structure such as cube, octahedron, and tetradecahedron, or the spherical or irregular crystal structure, or those having crystal defects such as twin plane, or those having a tabular form, or the combination thereof.

The term "cubic grains" according to the present invention is intended to include substantially cubic grains, that is silver halide grains which are regular cubic grains bounded by crystallographic faces (100), or which may have rounded edges and/or vertices or small faces (111), or may even be nearly spherical when prepared in the presence of soluble iodides or strong ripening agents, such as ammonia. Preparation of silver halide emulsions comprising cubic silver halide grains is described, for example, in Research Disclosure, Vol. 176, December 1978, Item 17643, Vol. 184, August 1979, Item 18431 and Vol 308, December 1989, Item 308119.

Other silver halide emulsions are those which employ one or more light-sensitive tabular grain emulsions as disclosed in U.S. Pat. Nos. 4,425,425 and 4,425,426. The tabular silver halide grains contained in the silver halide emulsion layers of this invention have an average diameter:thickness ratio (often referred to in the art as aspect ratio) of at least 3:1, preferably 3:1 to 20:1, more preferably 3:1 to 14:1, and most preferably 3:1 to 8:1. Average diameters of the tabular silver halide grains suitable for use in this invention range from about 0.3 μm to about 5 μm, preferably 0.5 μm to 3 μm, more preferably 0.8 μm to 1.5 μm. The tabular silver halide grains suitable for use in this invention have a thickness of less than 0.4 μm, preferably less than 0.3 μm and more preferably less than 0.2 μm.

The tabular silver halide grain characteristics described above can be readily ascertained by procedures well known to those skilled in the art. The term "diameter" is defined as the diameter of a circle having an area equal to the projected area of the grain. The term "thickness" means the distance between two substantially parallel main planes constituting the tabular silver halide grains. From the measure of diameter and thickness of each grain the diameter:thickness ratio of each grain can be calculated, and the diameter:thickness ratios of all tabular grains can be averaged to obtain their average diameter:thickness ratio. By this definition the average diameter:thickness ratio is the average of individual tabular grain diameter:thickness ratios. In practice, it is simpler to obtain an average diameter and an average thickness of the tabular grains and to calculate the average diameter:thickness ratio as the ratio of these two averages. Whatever the used method may be, the average diameter:thickness ratios obtained do not greatly differ.

Silver halide emulsions containing tabular silver halide grains can be prepared by various processes known for the preparation of radiographic elements. Silver halide emulsions can be prepared by the acid process, neutral process or ammonia process. In the stage for the preparation, a soluble silver salt and a halogen salt can be reacted in accordance with the single jet process, double jet process, reverse mixing process or a combination process by adjusting the conditions in the grain formation, such as pH, pAg, temperature, form and scale of the reaction vessel, and the reaction method. A silver halide solvent, such as ammonia, thioethers, thioureas, etc., may be used, if desired, for controlling grain size, form of the grains, particle size distribution of the grains, and the grain-growth rate.

Preparation of silver halide emulsions containing tabular silver halide grains is described, for example, in de Cugnac and Chateau, "Evolution of the Morphology of Silver Bromide Crystals During Physical Ripening", Science and Industries Photographiques, Vol. 33, No. 2 (1962), pp.121–125, in Gutoff, "Nucleation and Growth Rates During the Precipitation of Silver Halide Photographic Emulsions", Photographic Science and Engineering, Vol. 14, No. 4 (1970), pp. 248–257,in Berry et al., "Effects of Environment on the Growth of Silver Bromide Microcrystals", Vol. 5, No. 6 (1961), pp. 332–336, in U.S. Pat. Nos. 4,063,951, 4,067,739, 4,184,878, 4,434,226, 4,414,310, 4,386,156, 4,414,306 and in EP Pat. Appln. No. 263,508.

The silver halide grains may be of any required composition for forming a negative silver image, such as silver chloride, silver bromide, silver iodide, silver chlorobromide, silver bromoiodide, silver chlorobromoiodide and the like. Particularly good results are obtained with silver bromoiodide grains, preferably silver bromoiodide grains containing about 0.1 to 15% moles of iodide ions, more preferably about 0.5 to 10% moles of iodide ions and still preferably silver bromoiodide grains having average grain sizes in the range from 0.2 to 3 µm, more preferably from 0.4 to 1.5 µm.

In preparing the silver halide emulsions a wide variety of hydrophilic dispersing agents for the silver halides can be employed. Gelatin is preferred, although other colloidal materials such as gelatin derivatives, colloidal albumin, cellulose derivatives or synthetic hydrophilic polymers can be used as known in the art. Other hydrophilic materials useful known in the art are described, for example, in Research Disclosure, Vol. 308, Item 308119, Section IX.

The silver halide emulsions are spectrally sensitized. Spectral sensitization can be performed with a variety of spectral sensitizing dyes known in the art. An example of such spectral sensitizing dyes is the polymethine dye class, including cyanines, complex cyanines, merocyanines, complex merocyanines, oxonols, hemioxonols, styryls, merostyryls and streptocyanines.

Although native UV-blue sensitivity of silver halides is usually known in the art, significant advantage can be obtained by the use of spectral sensitizing dyes, even when their principal absorption is in the spectral region to which the silver halide emulsion have their native sensitivity.

Preferably, spectral sensitizing dyes according to this invention are those which exhibit J aggregates if absorbed on the surface of the silver halide grains and a sharp absorption band (J-band) with a bathocromic shifting with respect to the absorption maximum of the free dye in aqueous solution. Spectral sensitizing dyes producing J aggregates are well known in the art, as illustrated by F. M. Hamer, Cyanine Dyes and Related Compounds, John Wiley and Sons, 1964, Chapter XVII and by T. H. James, The Theory of the Photographic Process, 4th edition, Macmillan, 1977, Chapter 8.

In a preferred form, J-band exhibiting dyes are cyanine dyes. Such dyes comprise two basic heterocyclic nuclei joined by a linkage of methine groups. The heterocyclic nuclei preferably include fused benzene rings to enhance J aggregation.

The heterocyclic nuclei are preferably quinolinium, benzoxazolium, benzothiazolium, benzoselenazolium, benzimidazolium, naphthoxazolium, naphthothiazolium and naphthoselenazolium quaternary salts.

Other references to well known spectral sensitizer can be found in Research Disclosure, Vol. 308, December 1989, Item 308119, Section IV. Research Disclosure is a publication of Kenneth Mason Publication Ltd., Emsworth, Hampshire PO10 7DD, United Kingdom.

In case of symmetrical double side radiographic element each silver halide emulsion layer is sensitized to the same wavelength, e.g., for example, to the UV-blue band. In this case the radiographic film will be interposed between two intensifying screens of the present invention. On the other hand, the radiographic film can be realized with each silver halide emulsion layer sensitized to a different wavelength, e.g., for example, to the UV-blue and to the green portion of the electromagnetic spectrum. In this case, the silver halide emulsion layer sensitized to the green band will be exposed to a conventional green emitting intensifying screen, and a UV-blue emitting intensifying screen according the present invention will only expose the silver halide emulsion layer sensitized to the UV-blue portion of the electromagnetic spectrum.

Said green emitting phosphors emit radiation having more than about 80% of its spectral emission above 480 nm and its maximum of emission in the wavelength range of 530–570 nm. Green emitting phosphors include rare earth activated rare earth oxysulfide phosphors of at least one rare earth element selected from yttrium, lanthanum, gadolinium and lutetium, rare earth activated rare earth oxyhalide phosphors of the same rare earth elements, a phosphor composed of a borate of the above rare earth elements, a phosphor composed of a phosphate of the above rare earth elements and a phosphor composed of tantalate of the above rare earth elements. These rare earth green emitting phosphors have been extensively described in the patent literature, for example in U.S. Pat. Nos. 4,225,653, 3,418,246, 3,418,247, 3,725,704, 3,617,743, 3,974,389, 3,591,516, 3,607,770, 3,666,676, 3,795,814, 4,405,691, 4,311,487 and 4,387,141. These rare earth phosphors have a high X-ray stopping power and high efficiency of light emission when excited with X radiation and enable radiologists to use substantially lower X radiation dosage levels. Particularly suitable phosphors for green emitting intensifying screens are terbium or terbium-thulium activated rare earth oxysulfide phosphors.

In addition to the features specifically described above, the double side radiographic elements in the silver halide emulsion layers or in other layers, can include additional addenda of conventional nature, such as stabilizers, antifoggants, brighteners, absorbing materials, hardeners, coating aids, plasticizers, lubricants, matting agents, antikinking agents, antistatic agents, and the like, as described in Research Disclosure, Vol. 176, December 1978, Item 17643, in Research Disclosure, Vol. 184, August 1979 Item 18431, and in Research Disclosure, Vol. 308, December 1989, Item 308119.

As regards the processes for the silver halide emulsion preparation and the use of particular ingredients in the emulsion and in the light-sensitive element, reference is made to Research Disclosure 184, Item 18431, August 1979, wherein the following chapters are dealt with in deeper details:

IA. Preparation, purification and concentration methods for silver halide emulsions.
IB. Emulsion types.
IC. Crystal chemical sensitization and doping.
II. Stabilizers, antifogging and antifolding agents.
IIA. Stabilizers and/or antifoggants.
IIB. Stabilization of emulsions chemically sensitized with gold compounds.

IIC. Stabilization of emulsions containing polyalkylene oxides or plasticizers.
IID. Fog caused by metal contaminants.
IIE. Stabilization of materials comprising agents to increase the covering power.
IIF. Antifoggants for dichroic fog.
IIG. Antifoggants for hardeners and developers comprising hardeners.
IIH. Additions to minimize desensitization due to folding.
III. Antifoggants for emulsions coated on polyester bases.
IIJ. Methods to stabilize emulsions at safety lights.
IIK. Methods to stabilize x-ray materials used for high temperature. Rapid Access, roller processor transport processing.
III. Compounds and antistatic layers.
IV. Protective layers.
V. Direct positive materials.
VI. Materials for processing at room light.
VII. X-ray color materials.
VIII. Phosphors and intensifying screens.
IX. Spectral sensitization.
X. UV-sensitive materials
XII. Bases

EXAMPLE 1

Silver Halide Radiographic Films

Film 1

A silver halide radiographic film having a spectrally unsensitized silver halide emulsion layer (the back layer) coated on one side of the support and a green sensitized silver halide emulsion layer (the front layer) coated on the other side of the support was prepared in the following manner.

On one side of a polyester support (thickness 0.18 mm) was coated a silver halide emulsion blend comprising 50 parts by weight of a silver halide gelatin emulsion containing cubic silver bromoiodide grains having 2% mol of iodide and an average grain size of 0.8 µm, and 50 parts by weight of a silver halide gelatin emulsion containing cubic silver bromoiodide grains having 2% mol of iodide and an average grain size of 1.35 µm. The emulsion was sulfur and gold chemically sensitized, and added with resorcylaldehyde and dimethylol urea hardeners. The silver and gelatin coverage were respectively of 2.45 g/m$^2$ and 1.82 g/m$^2$. A protective overcoat containing 1.2 g/m$^2$ gelatin was applied to said silver bromoiodide back layer.

On the other side of the polyester support was coated a spectrally sensitized silver halide emulsion blend comprising 90 pads by weight of a silver halide gelatin emulsion containing cubic silver bromoiodide grains having 2% mol of iodide and an average grain size of 0.8 µm, and 10 parts by weight a silver halide gelatin emulsion containing cubic silver bromoiodide grains having 1.6% mol of iodide and an average grain size of 0.4 µm. The emulsion was sulfur and gold chemically sensitized, spectrally sensitized with 500 mg/mole Ag of the green sensitizing Dye A, anhydro-5,5'-dichloro-9-ethyl-3,3'-bis-(3-sulfopropyl)-oxacarbocyanine-hydroxyde triethylamine salt, and added with resorcylaldehyde and dimethylol urea hardeners. The silver and gelatin coverage were respectively of 2.20 g/m$^2$ and 1.68 g/m$^2$. A protective overcoat containing 1.2 g/m$^2$ gelatin was applied to said silver bromoiodide front layer.

Film 2

A silver halide radiographic film having a spectrally unsensitized silver halide emulsion layer (the back layer) coated on one side of the support and a green sensitized silver halide emulsion layer (the front layer) coated on the other side of the support was prepared in the following manner.

On one side of a polyester support (thickness 0.18 mm) was coated a silver halide emulsion blend comprising 25 pads weight of a silver halide gelatin emulsion containing cubic silver bromoiodide grains having 2% mol of iodide and an average grain size of 0.8 µm, and 75 pads by weight of a silver halide gelatin emulsion containing cubic silver bromoiodide grains having 2% mol of iodide and an average grain size of 1.35 µm. The emulsion was sulfur and gold chemically sensitized, and added with resorcylaldehyde and dimethylol urea hardeners. The silver and gelatin coverage were respectively of 2.55 g/m$^2$ and 1.82 g/m$^2$. A protective overcoat containing 1.2 g/m$^2$ gelatin was applied to said silver bromoiodide back layer.

On the other side of the polyester support was coated a spectrally sensitized silver halide emulsion blend comprising 90 pads by weight of a silver halide gelatin emulsion containing cubic silver bromoiodide grains having 2% mol of iodide and an average grain size of 0.8 µm, and 10 pads by weight a silver halide gelatin emulsion containing cubic silver bromoiodide grains having 1.6% mol of iodide and an average grain size of 0.4 µm. The emulsion was sulfur and gold chemically sensitized, spectrally sensitized with 500 mg/mole Ag of the green sensitizing Dye A, anhydro-5,5'-dichloro-9-ethyl-3,3'-bis-(3-sulfopropyl)-oxacarbocyanine hydroxyde triethylamine salt, and added with resorcylaldehyde and dimethylol urea hardeners. The silver and gelatin coverage were respectively of 2.20 g/m$^2$ and 1.68 g/m$^2$. A protective overcoat containing 1.2 g/m$^2$ gelatin was applied to said silver bromoiodide back layer.

Film 3

A silver halide radiographic film having a spectrally unsensitized silver halide emulsion layer coated on both sides of the support was prepared in the following manner.

On both sides of a polyester support (thickness 0.18 mm) was coated a silver halide emulsion blend comprising 60 pads by weight of a silver halide gelatin emulsion containing cubic silver bromoiodide grains having 2% mol of iodide and an average grain size of 1.35 µm, and 40 pads by weight of a silver halide gelatin emulsion containing cubic silver bromoiodide grains having 2% mol of iodide and an average grain size of 0.8 µm. The emulsion was sulfur and gold chemically sensitized, and added with resorcylaldehyde and dimethylol urea hardeners. The silver and gelatin coverage were respectively of 2.20 g/m$^2$ and 1.68 g/m$^2$. A protective overcoat containing 1.2 g/m$^2$ gelatin was applied to said silver bromoiodide layers.

Phosphor Screens

UV-blue Emitting Phosphor Screen (Comparison)

A radiographic screen (SCREEN 1) was prepared by coating a UV-blue emitting (Y, Sr, Li)TaO$_4$ phosphor manufactured by Nichia Kagaku Kogyo K.K. under the trade name of NP-3040-08M-01 with average particle grain size of 6.4 µm in a hydrophobic polymer binder at a phosphor coverage of 690 g/m² and a thickness of 175 μm on a polyester support having a thickness of 250 μm. Between the phosphor layer and the support a reflective layer of $TiO_2$ particles in a polyurethane binder was coated at a thickness of 25 μm. The screen was overcoated with a cellulose triacetate protective layer of 5 μm.

UV-blue Emitting Phosphor Screen (Comparison)

A radiographic screen (SCREEN 2) was prepared by coating a UV-blue emitting (Y, Sr, Li)TaO₄ phosphor manufactured by Nichia Kagaku Kogyo K.K. under the trade name of NP-3044-02M-00 with average particle grain size of 5.5 μm in a hydrophobic polymer binder at a phosphor coverage of 525 g/m² and a thickness of 135 μm on a polyester support having a thickness of 250 μm. Between the phosphor layer and the support a reflective layer of $TiO_2$ particles in a polyurethane binder was coated at a thickness of 25 μm. The screen was overcoated with a cellulose triacetate protective layer of 5 μm.

UV-blue Emitting Phosphor Screen (Invention)

A radiographic screen (SCREEN 3) was prepared by coating a UV-blue emitting (Y, Sr, Li)TaO₄ phosphor manufactured by Nichia Kagaku Kogyo K.K. under the trade name of NP-3040-08M-01 with average particle grain size of 6.4 μm in a hydrophobic polymer binder at a phosphor coverage of 500 g/m² and a thickness of 140 μm on a polyester support having a thickness of 250 μm. A reflective layer of $TiO_2$ particles in a polyurethane binder was coated on the support at a thickness of 20 μm. A fluorescent dye layer of 5 μm comprising 4% by weight of UVITEX TM CK in gelatin was coated between the reflective layer and the phosphor layer. UVITEX TM CK is a registered trademark of Ciba-Geigy Ltd. and contains the Color Index Fluorescent Brightener 119 (a bistriazinylaminostilbene sulfonate derivative). The screen was overcoated with a cellulose triacetate protective layer of 5 μm.

UV-blue Emitting Phosphor Screen (Invention)

A radiographic screen (SCREEN 4) was prepared by coating a UV-blue emitting (Y, Sr, Li)TaO₄ phosphor manufactured by Nichia Kagaku Kogyo K.K. under the trade name of NP-3044-02M-00 with average particle grain size of 5.5 μm in a hydrophobic polymer binder at a phosphor coverage of 465 g/m² and a thickness of 119 μm on a polyester support having a thickness of 250 μm. A reflective layer of $TiO_2$ particles in a polyurethane binder was coated on the support at a thickness of 20 μm. A fluorescent dye layer of 5 μm comprising 4% by weight of UVITEX TM CK in gelatin was coated between the reflective layer and the phosphor layer. The screen was overcoated with a cellulose triacetate protective layer of 5 μm.

UV-blue Emitting Phosphor Screen (Invention)

A radiographic screen (SCREEN 5) was prepared by coating a UV-blue emitting (Y, Sr, Li)TaO₄ phosphor manufactured by Nichia Kagaku Kogyo K.K. under the trade name of NP-3040-08M-01 with average particle grain size of 6.4 μm in a hydrophobic polymer binder at a phosphor coverage of 690 g/m² and a thickness of 175 μm on a polyester support having a thickness of 250 μm. A reflective layer of $TiO_2$ particles in a polyurethane binder was coated on the support at a thickness of 20 μm. A fluorescent dye layer of 5 μm comprising 4% by weight of UVITEX TM CK in gelatin was coated between the reflective layer and the phosphor layer. The screen was overcoated with a cellulose triacetate protective layer of 5 μm.

Green Emitting Phosphor Screen (Reference)

A radiographic screen (SCREEN 6) was prepared by coating a green emitting $Gd_2O_2S$:Tb phosphor manufactured by Nichia Kagaku Kogyo K.K. under the trade name NP-3010-32M-01 with average particle grain size of 5.4 μm in a hydrophobic polymer binder at a phosphor coverage of 433 g/m² and a thickness of 110 μm on a polyester support having a thickness of 250 μm. Between the phosphor layer and the support a reflective layer of $TiO_2$ particles in a polyurethane binder was coated at a thickness of 25 μm. The screen was overcoated with a cellulose triacetate protective layer of 5 μm.

EXAMPLE 2

Assembly 1

A comparison radiographic assembly was prepared by interposing the film 1 between the front screen 6 and the back screen 1. This assembly was compared with the radiographic assembly obtained by substituting the back screen with screen 3 of the present invention.

Assembly 2

A comparison radiographic assembly was prepared by interposing the film 2 between the front screen 6 and the back screen 2. This assembly was compared with the radiographic assembly obtained by substituting the back screen with screen 4 of the present invention.

Assembly 3

A comparison radiographic assembly was prepared by interposing the film 1 between the front screen 6 and the back screen 1. This assembly was compared with the radiographic assembly obtained by substituting the back screen with screen 5 of the present invention.

Processing

The above described assemblies were exposed to X-rays from a tungsten target tube operated at 80 kVp and 25 mA from a distance of 120 cm. The X-rays passed through an aluminum step wedge before reaching the assembly. Following exposure the films were processed in a 3M Trimatic TM XP515 processor at a total processing time of 90 seconds using the developer and fixer having the following composition:

| DEVELOPER | | |
|---|---|---|
| KOH (sol. 35% by weight) | g | 105 |
| Acetic acid | g | 7.6 |
| Glutaraldehyde (sol. 50% by weight) | g | 7.2 |
| Sodium metabisulfite | g | 45.0 |
| Ethylene glycol | g | 10.0 |
| Diethylene glycol | g | 4.9 |
| Morpholinomethanediphosphonic acid (sol. 40% by weight) | g | 7.5 |
| 5-Methylbenzotriazole | mg | 80.0 |
| 5-Nitroindazole | mg | 107.0 |
| 1-Phenyl-1H-tetrazole-5-thiole | mg | 7.0 |
| Boric acid | g | 1.7 |
| Potassium carbonate | g | 13.25 |
| Ethylenediaminotetracetic acid.4Na.2H₂O | g | 1.5 |
| 1-Phenyl-3-pyrazolidone | g | 1.45 |
| Hydroquinone | g | 20.0 |
| NaBr | g | 5.0 |
| Water to make | l | 1 |

-continued

| pH | | 10.35 |
|---|---|---|
| FIXER | | |
| Ammonium thiosulfate | g | 145.2 |
| Sodium sulfite | g | 8.12 |
| Boric acid | g | 7.0 |
| Acetic acid | g | 7.52 |
| Ammonium acetate | g | 19.24 |
| Aluminum sulfate | g | 7.74 |
| Sulfuric acid | g | 3.58 |
| 2-Phenoxyethanol | g | 0.12 |
| Water to make | l | 1 |
| pH | | 4.30 |

The results are summarized in the following table 2.

TABLE 2

| | Speed Diff. | MTF (l/mm) | | | | Phosphor cover. g/m² |
|---|---|---|---|---|---|---|
| | | 1.4 | 2.0 | 3.0 | 4.5 | |
| Assembly 1 | | | | | | |
| Reference | — | 0.57 | 0.44 | 0.28 | 0.15 | 690 |
| Invention | 0.01 | 0.58 | 0.45 | 0.28 | 0.16 | 500 |
| Assembly 2 | | | | | | |
| Reference | — | 0.58 | 0.47 | 0.30 | 0.17 | 525 |
| Invention | 0.02 | 0.57 | 0.47 | 0.31 | 0.18 | 465 |
| Assembly 3 | | | | | | |
| Reference | — | 0.57 | 0.44 | 0.28 | 0.15 | 690 |
| Invention | 0.15 | 0.57 | 0.42 | 0.27 | 0.15 | 690 |

The speed difference is expressed as the result of Speed$_{Inv}$ − Speed$_{Ref}$. The comparison of assembly 1 and assembly 2 clearly shows a reduction of phosphor coverage without any loss of image quality and speed. The invention example of Assembly 1 has a phosphor coverage savings of 27% by weight relative to the comparison. The invention example of Assembly 2 has a phosphor coverage savings of 12% by weight relative to the comparison.

The comparison of assembly 3 (having the same phosphor coverage) clearly shows a 0.15 LogE increase in speed without any loss of image quality.

EXAMPLE 3

A first set of radiographic screens comprising a UV-blue emitting Y, Sr, Li)TaO₄ phosphor manufactured by Nichia Kagaku Kogyo K.K. under the trade name of NP-3040-08M-01 with average particle grain size of 6.4 μm in a hydrophobic polymer binder was prepared at a variable phosphor coverage of from 400 to 1000 g/m² on a polyester support having a thickness of 250 μm. Between the phosphor layer and the support a reflective layer of TiO₂ particles in a polyurethane binder was coated at a thickness of 25 μm. The screen was overcoated with a cellulose triacetate protective layer of 5 μm.

A second set of radiographic screens was prepared in the same manner by interposing between the phosphor layer and the reflective layer a 5 μm fluorescent dye layer comprising 4% by weight in gelatin of UVI-TEX ™ CK.

A third set comprising 8% by weight of UVI-TEX ™ CK was prepared following the same procedure of second set.

The radiographic film 3 of Example 1 was interposed between each of the above described radiographic screens and was exposed and processed as described in Example 2. The relative speed results are represented in Table 3. Table 3 clearly shows that for each phosphor coverage an increase in speed of at least 0.15 LogE occurs. On the other hand it is also evident that a savings of phosphor coverage of at least 25% can be obtained without any loss of speed.

TABLE 3

| Phosphor coverage g/m² | Reference Speed | 4% UVITEX Speed | 8% UVITEX Speed | Delta Speed 4% | Delta Speed 8% |
|---|---|---|---|---|---|
| 400 | 0.22 | 0.39 | 0.41 | 0.17 | 0.19 |
| 500 | 0.26 | 0.43 | 0.45 | 0.17 | 0.19 |
| 700 | 0.34 | 0.50 | 0.52 | 0.16 | 0.18 |
| 900 | 0.41 | 0.58 | 0.60 | 0.17 | 0.19 |
| 1100 | 0.44 | 0.62 | 0.64 | 0.18 | 0.20 |

EXAMPLE 4

A first set of radiographic screens comprising a UV-blue emitting (Y, Sr, Li)TaO₄ phosphor manufactured by Nichia Kagaku Kogyo K.K. under the trade name of NP-3040-08M-01 with average particle grain size of 6.4 μm in a hydrophobic polymer binder was prepared at a variable phosphor coverage on a polyester support having a thickness of 250 μm. Between the phosphor layer and the support a reflective layer of TiO₂ particles in a polyurethane binder was coated at a thickness of 25 μm. The screen was overcoated with a cellulose triacetate protective layer of 5 μm.

A second set of radiographic screens was prepared in the same manner by interposing between the phosphor layer and the support a reflective layer of 150 μm comprising, dispersed therein, 4% by weight of UVI-TEX ™ CK.

The radiographic film 3 of Example 1 was interposed between each of the above described radiographic screens and was exposed and processed as described in Example 2. The relative speed results, relative to each phosphor coverage, are represented in the following Table 4. Table 4 clearly shows that for each phosphor coverage an increase in speed of at least 0.10 LogE occurs. On the other hand it is also evident that a savings of phosphor coverage of at least 25% can be obtained without any loss of speed.

TABLE 4

| Phosphor Coverage g/m² | Invention Speed | Reference Speed | Delta Speed |
|---|---|---|---|
| 1100 | 0.58 | 0.43 | 0.15 |
| 900 | 0.55 | 0.40 | 0.15 |
| 600 | 0.52 | 0.32 | 0.20 |
| 400 | 0.42 | 0.22 | 0.20 |
| 300 | 0.30 | 0.10 | 0.20 |

We claim:

1. An X-ray intensifying screen comprising a support, a reflective layer, and a phosphor layer, wherein said phosphor is selected from the group of UV-blue emitting phosphors having their emission maximum at a wavelength shorter than 450 nm, and wherein a fluorescent dye layer is interposed between said reflective layer and said phosphor layer, said fluorescent dye layer comprising a fluorescent dye having its spectral absorption maximum at a wavelength shorter than 400 nm and its spectral emission maximum at a wavelength longer than 400 nm.

2. The X-ray intensifying screen of claim 1 characterized in that said fluorescent dye is selected from the group consisting of stilbene sulfonate and bis-triazinylaminostilbene sulfonate derivatives.

3. The X-ray intensifying screen of claim 1 characterized in that said fluorescent dye is represented by the formula:

wherein X is SO₃H or SO₃M, in which M is an alkaline metal or alkaline earth metal, Y is represented by the formula:

in which A is a bivalent atom or group of atoms, Z is a group of atoms capable of completing a 5- or 6-membered heterocyclic ring, said ring containing from 1 to 3 nitrogen atoms and 2 to 5 carbon atoms, R₁ and R₂ independently are a hydrogen atom, a hydroxyl group, an aryloxy group, an alkoxyl group, a polyoxyalkylene, a halogen atom, a heterocyclic radical, an alkylthio group, an arylthio group, a heterocyclylthio group, an amino group, an alkylamino group, or an arylamino group,
and wherein n is 1 to 4, and m is 0 to 1.

4. The X-ray intensifying screen of claim 1 characterized in that said fluorescent dye is represented by the formula:

wherein X is SO₃H or SO₃M, in which M is an alkaline metal or alkaline earth metal, R₁ and R₂ independently are a hydrogen atom, a hydroxyl group, an aryloxy group, an alkoxyl group, a polyoxyalkylene, a halogen atom, a heterocyclic radical, an alkylthio group, an arylthio group, a heterocyclylthio group, an amino group, an alkylamino group, or an arylamino group, and wherein n is 1 to 4.

5. The X-ray intensifying screen of claim 1 characterized in that said fluorescent dye is dispersed or dissolved in a binder.

6. The X-ray intensifying screen of claim 5 characterized in that said binder is a hydrophilic colloid.

7. The X-ray intensifying screen of claim 5 characterized in that said fluorescent dye layer comprises an amount of said fluorescent dye of from 1 to 15% by weight of binder.

8. The X-ray intensifying screen of claim 5 characterized in that said fluorescent dye layer comprises an amount of said fluorescent dye of from 2 to 10% by weight of binder.

9. The X-ray intensifying screen of claim 1 characterized in that said fluorescent dye layer has a thickness of from 1 to 30 μm.

10. The X-ray intensifying screen of claim 1 characterized in that said UV-blue emitting phosphor is represented by the formula:

$$(Y_{1-\frac{3}{2}x-\frac{1}{2}y}Sr_xLi_y)TaO_4$$

wherein x and y are numbers satisfying the conditions $10^{-5} \leq x \leq 1$ and $10^{-4} \leq y \leq 0.1$.

11. The X-ray intensifying screen of claim 1 characterized in that said phosphor layer has a thickness of from 10 to 500 μm.

12. The X-ray intensifying screen of claim 1 characterized in that said reflective layer comprises a titanium dioxide pigment dispersed in a hydrophilic colloid.

13. The X-ray intensifying screen of claim 1 characterized in that said reflective layer has a thickness higher than 10 μm.

14. An X-ray intensifying screen comprising a support, a reflective layer, and a phosphor layer, wherein said phosphor is selected from the group of UV-blue emitting phosphors having their emission maximum at a wavelength shorter than 450 nm, and wherein a fluorescent dye having its spectral absorption maximum at a wavelength shorter than 400 nm and its spectral emission maximum at a wavelength longer than 400 nm is dispersed into said reflective layer.

15. The X-ray intensifying screen of claim 14 characterized in that said fluorescent dye is selected from the group consisting of stilbene sulfonate and bis-triazinylaminostilbene sulfonate derivatives.

16. The X-ray intensifying screen of claim 14 wherein said fluorescent dye is dispersed or dissolved in a binder.

17. The X-ray intensifying screen of claim 16 wherein said binder comprises gelatin.

18. The X-ray intensifying screen of claim 16 wherein said fluorescent dye comprises from 2 to 15% by weight of said binder.

19. The X-ray intensifying screen of claim 17 wherein said fluorescent dye comprises from 2 to 15% by weight of said binder.

20. The X-ray intensifying screen of claim 14 wherein said reflective layer comprises a titanium oxide pigment dispersed in a binder.

* * * * *

UNITED STATES PATENT AND TRADEMARK OFFICE
CERTIFICATE OF CORRECTION

PATENT NO. : 5,432,351
DATED : July 11, 1995
INVENTOR(S) : Pesce et al.

It is certified that error appears in the above-indentified patent and that said Letters Patent is hereby corrected as shown below:

Column 13, line 54, delete "pads" and insert --parts--.
Column 14, line 11, delete "pads" and insert --parts--.
Column 14, line 14, delete "pads" and insert --parts--.
Column 14, line 25, delete "pads" and insert --parts--.
Column 14, line 28, delete "pads" and insert --parts--.
Column 14, line 48, delete "pads" and insert --parts--.
Column 14, line 52, delete "pads" and insert --parts--.

Signed and Sealed this

Sixteenth Day of January, 1996

Attest:

BRUCE LEHMAN

*Attesting Officer*     Commissioner of Patents and Trademarks